United States Patent

Lok

[11] Patent Number: 6,068,519
[45] Date of Patent: May 30, 2000

[54] BATTERY CONNECTOR

[75] Inventor: Gordon Lok, Montebello, Calif.

[73] Assignee: Hon Hai Precision Ind. Co., Ltd., Taipei Hsien, Taiwan

[21] Appl. No.: 09/414,998

[22] Filed: Oct. 7, 1999

[51] Int. Cl.⁷ .................................................. H01R 13/502
[52] U.S. Cl. .......................................... 439/660; 439/701
[58] Field of Search .................................... 439/500, 660, 439/701

[56] References Cited

U.S. PATENT DOCUMENTS

| 5,259,786 | 11/1993 | Huang | 439/500 |
| 5,338,231 | 8/1994 | Wilhite | 439/660 |
| 5,518,424 | 5/1996 | Douty et al. | 439/660 |
| 5,865,643 | 2/1999 | Suzuki | 439/500 |

Primary Examiner—Gary F. Paumen
Attorney, Agent, or Firm—Wei Te Chung

[57] ABSTRACT

A battery connector includes an elongate insulative base with a plurality of generally U-shaped conductive contacts fixed thereto. Each contact has a first limb fixed to a bottom face of the base and a second limb connected to the first limb and resiliently supported above a top face of the base. An insulative cover has a top wall and a circumferential side wall extending from the top wall. The side wall defines an interior space for receiving the base and the contacts therein. The top wall defines a plurality slots through which the second limbs of the contacts partially extend for engaging with a battery. Two pairs of resilient arms, each forming a barb, extend from the top wall of the cover for releasably engaging the barbs with corresponding grooves defined in the corresponding side face of the base thereby securing the cover to the base. A guide pin extends from the top wall of the cover for being inserted into a corresponding bore defined in the base thereby properly positioning the cover with respect to the base.

4 Claims, 10 Drawing Sheets

BATTERY CONNECTOR

BACKGROUND OF THE INVENTION

1. Field of the Invention

The present invention generally relates to a battery connector for a mobile phone, and in particular to a mobile phone battery connector having a protective cover for protection of contacts thereof.

2. The Prior Art

Mobile phones are a commonly used personal communication measure. Mobile phones are powered by rechargeable battery sets. The mobile phone is provided with a battery connector phone having electrically conductive contacts for electrically connecting the battery set to a main circuit board of the mobile phone. Conventionally, the battery connector comprises no cover and the contacts thereof are exposed without protection. The electrical conductivity and other properties may not be maintained after a long-term use and the service life of the connector may thus be reduced.

Thus, it is desirable to provide a battery connector comprising a protective cover for overcoming the above problems.

SUMMARY OF THE INVENTION

Accordingly, an object of the present invention is to provide a battery connector comprising a protective cover for protecting contacts thereof.

Another object of the present invention is to provide a battery connector having an extended service life.

A further object of the present invention is to provide a battery connector comprising a cover for per-loading and retaining contacts thereof in position.

To achieve the above objects, in accordance with the present invention, a battery connector comprises an elongate insulative base with a plurality of generally U-shaped conductive contacts fixed thereto. Each contact has a first limb fixed to a bottom face of the base and a second limb connected to the first limb and resiliently supported above a top face of the base. An insulative cover has a top wall and a circumferential side wall extending from the top wall. The side wall defines an interior space for receiving the base and the contacts therein. The top wall defines a plurality of slots through which the second limbs of the contacts partially extend for engaging with a battery. Two pairs of resilient arms, each forming a barb, extend from the top wall of the cover for being releasably engaged with corresponding grooves defined in the corresponding side face of the base thereby securing the cover to the base. A guide pin extends from the top wall of the cover for being inserted into a corresponding bore defined in the base thereby properly positioning the cover with respect to the base.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
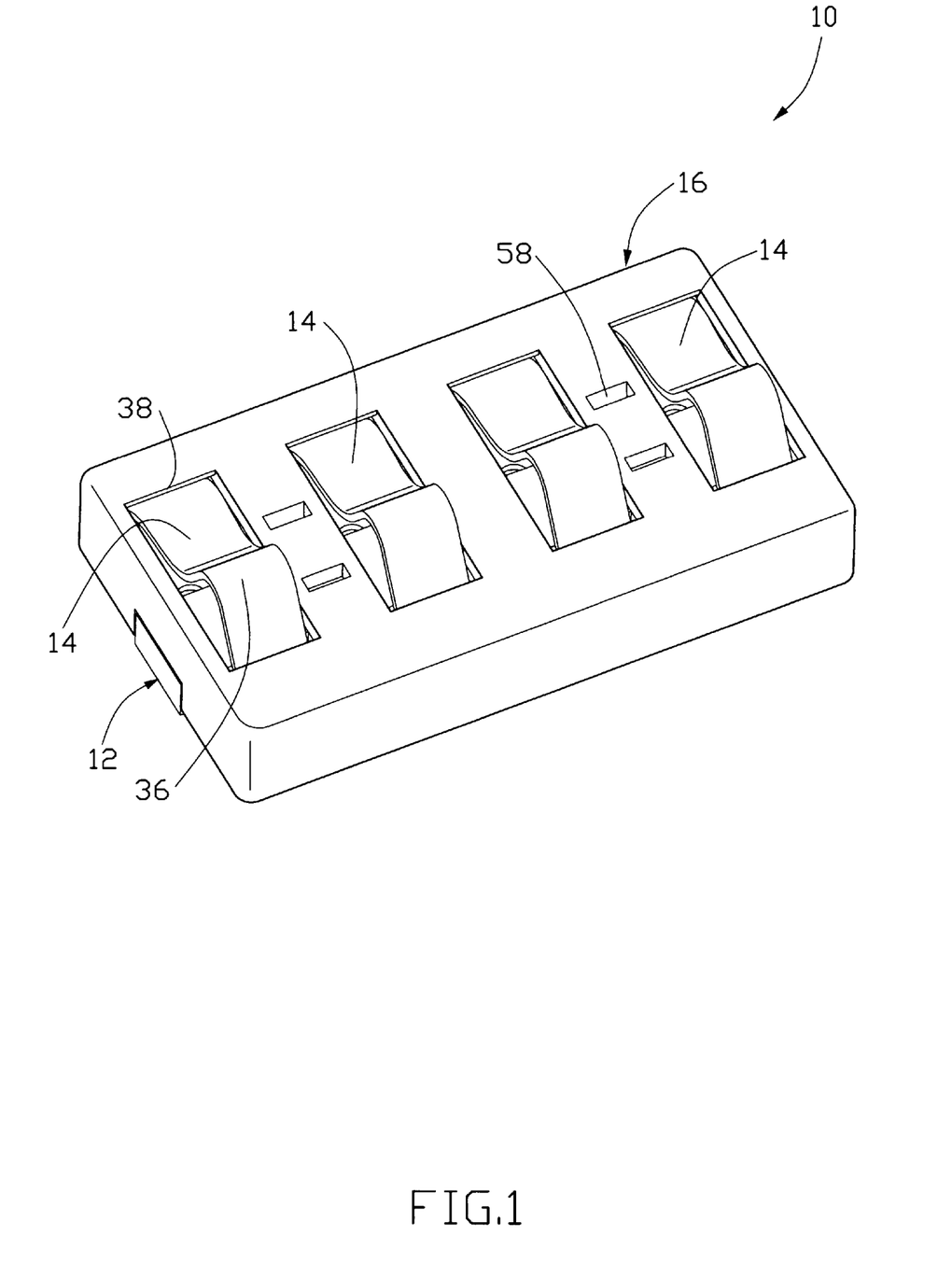
FIG. 1 is a perspective view of a battery connector constructed in accordance with a first embodiment of the present invention.
Figure 2:
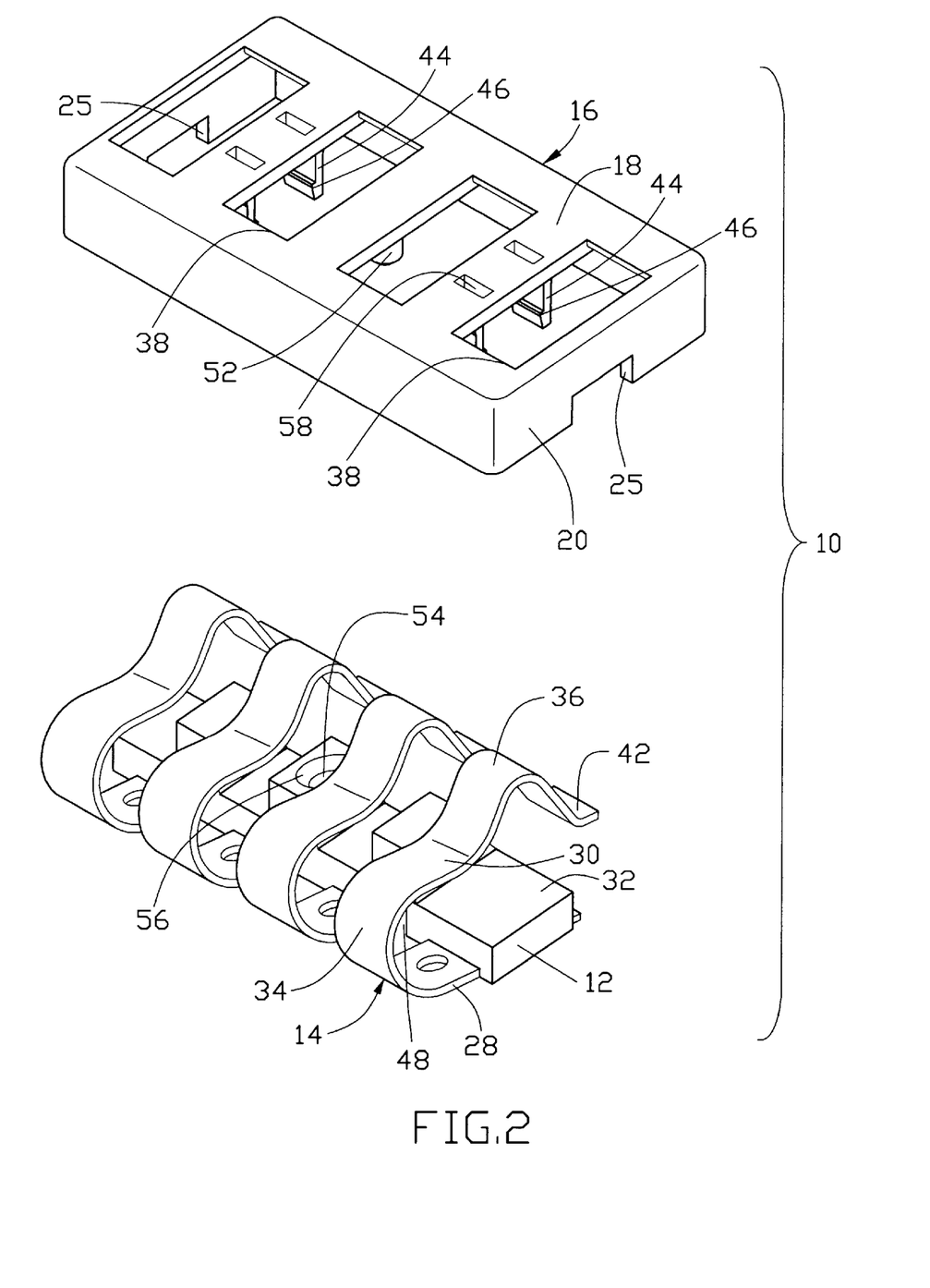
FIG. 2 is an exploded view of the battery connector of the present invention.
Figure 3:
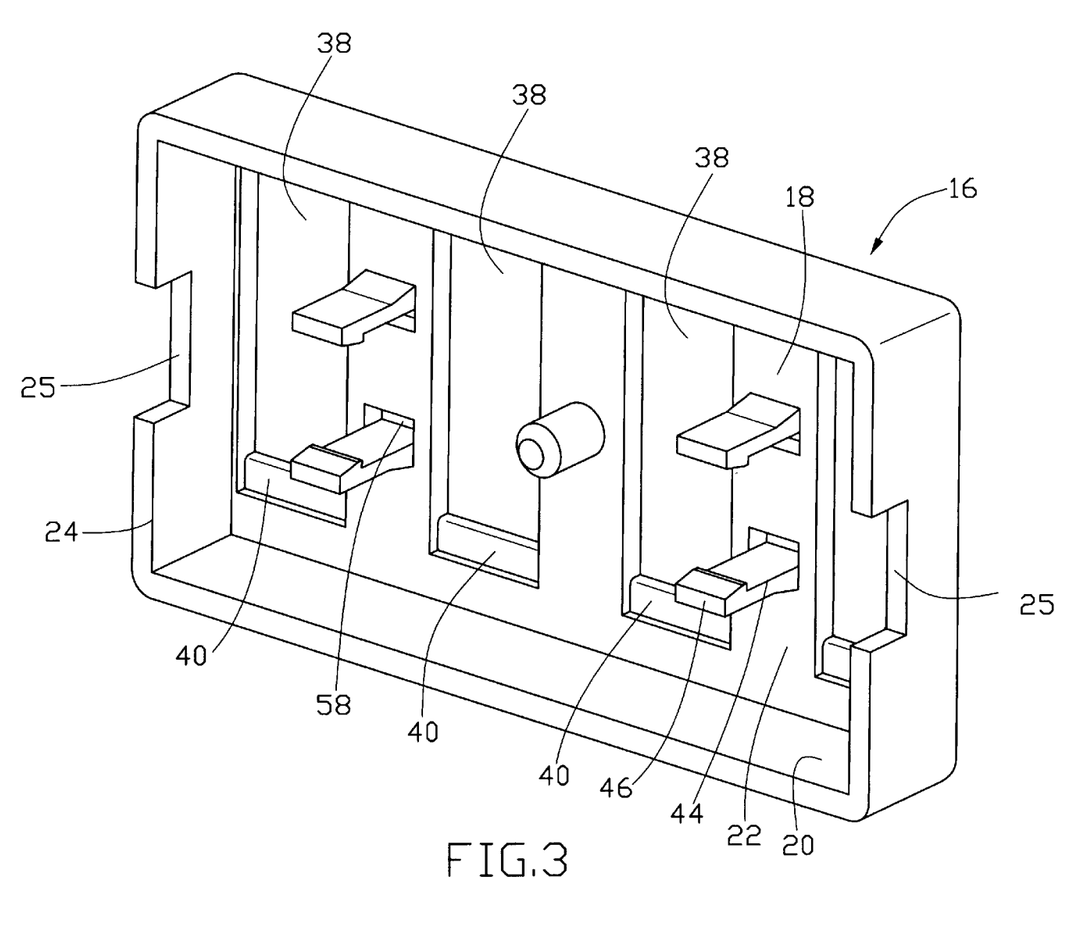
FIG. 3 is a perspective view of a cover of the battery connector of the present invention.
Figure 4:
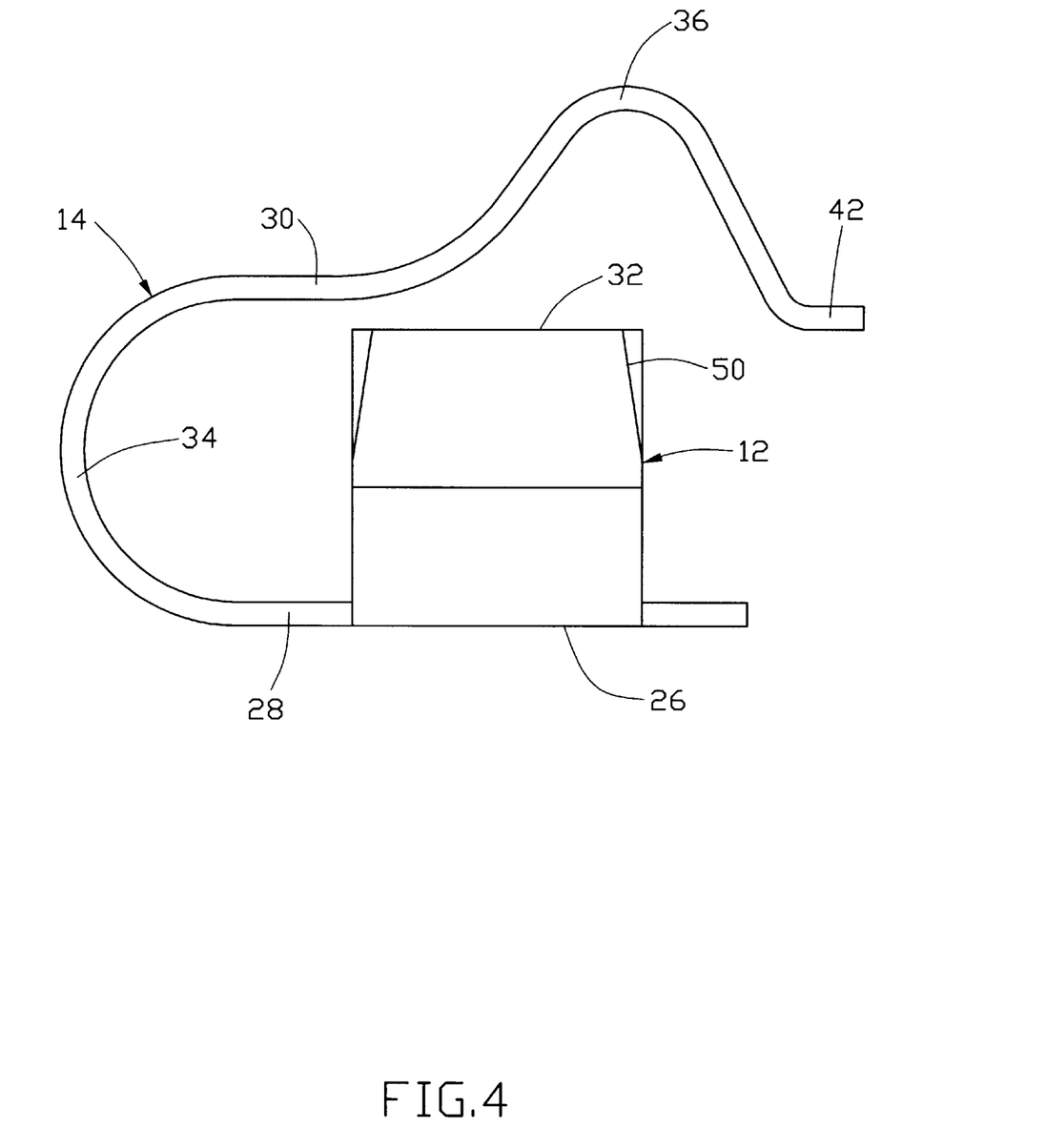
FIG. 4 is an end view of a base, with contacts mounted thereto, of the battery connector of the present invention.
Figure 5:
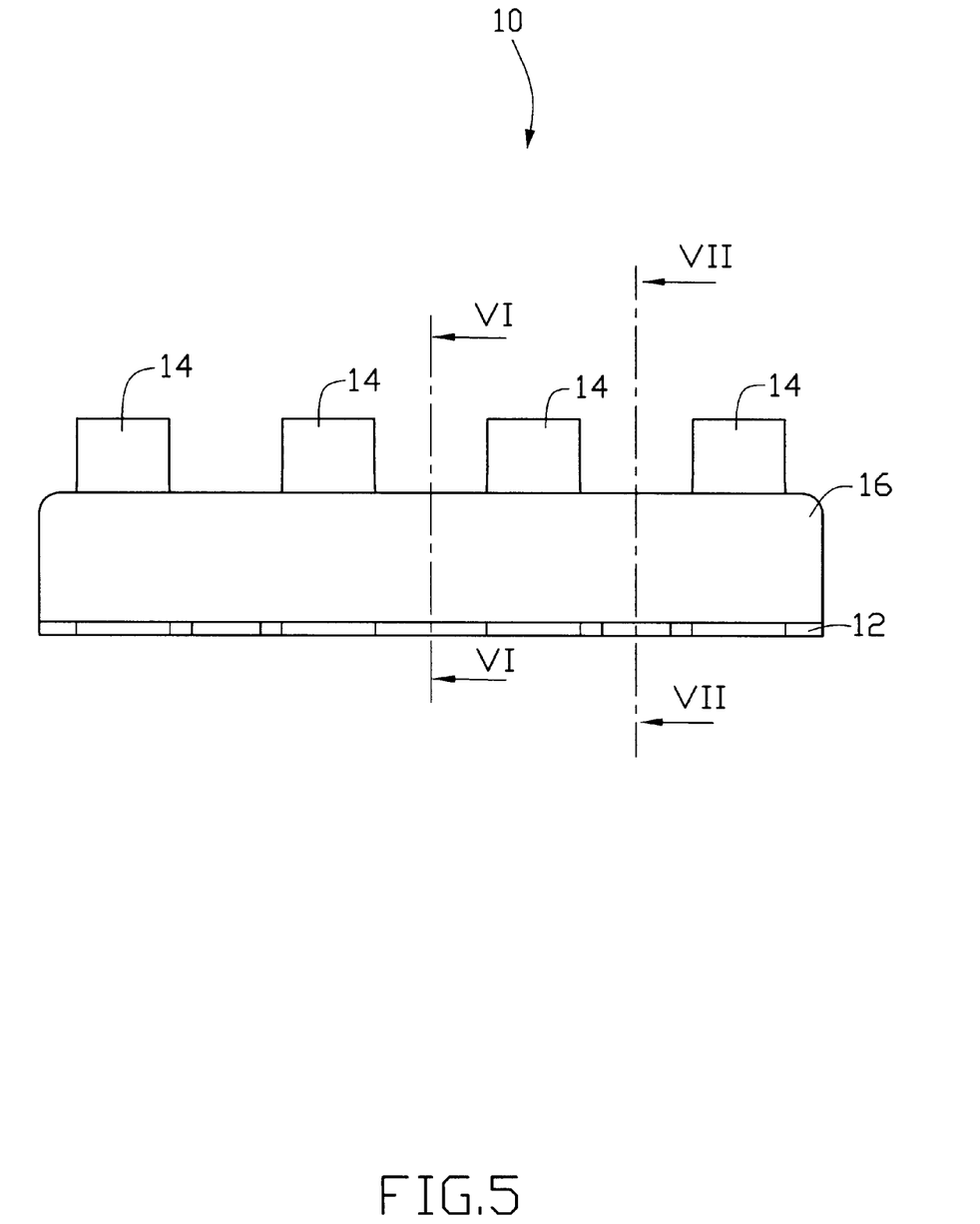
FIG. 5 is a side elevational view of the battery connector of the present invention.
Figure 6:
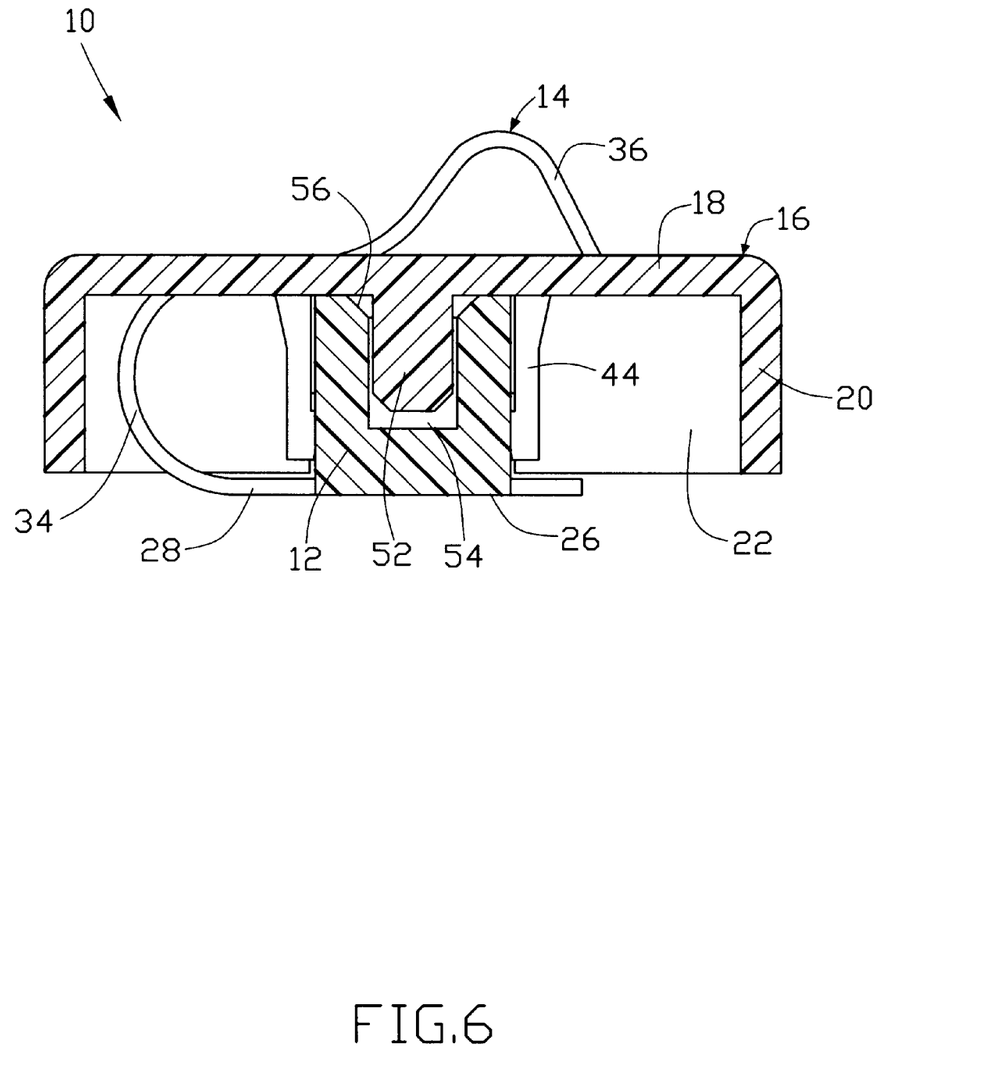
FIG. 6 is a cross-sectional view taken along line VI—VI of FIG. 5
Figure 7:
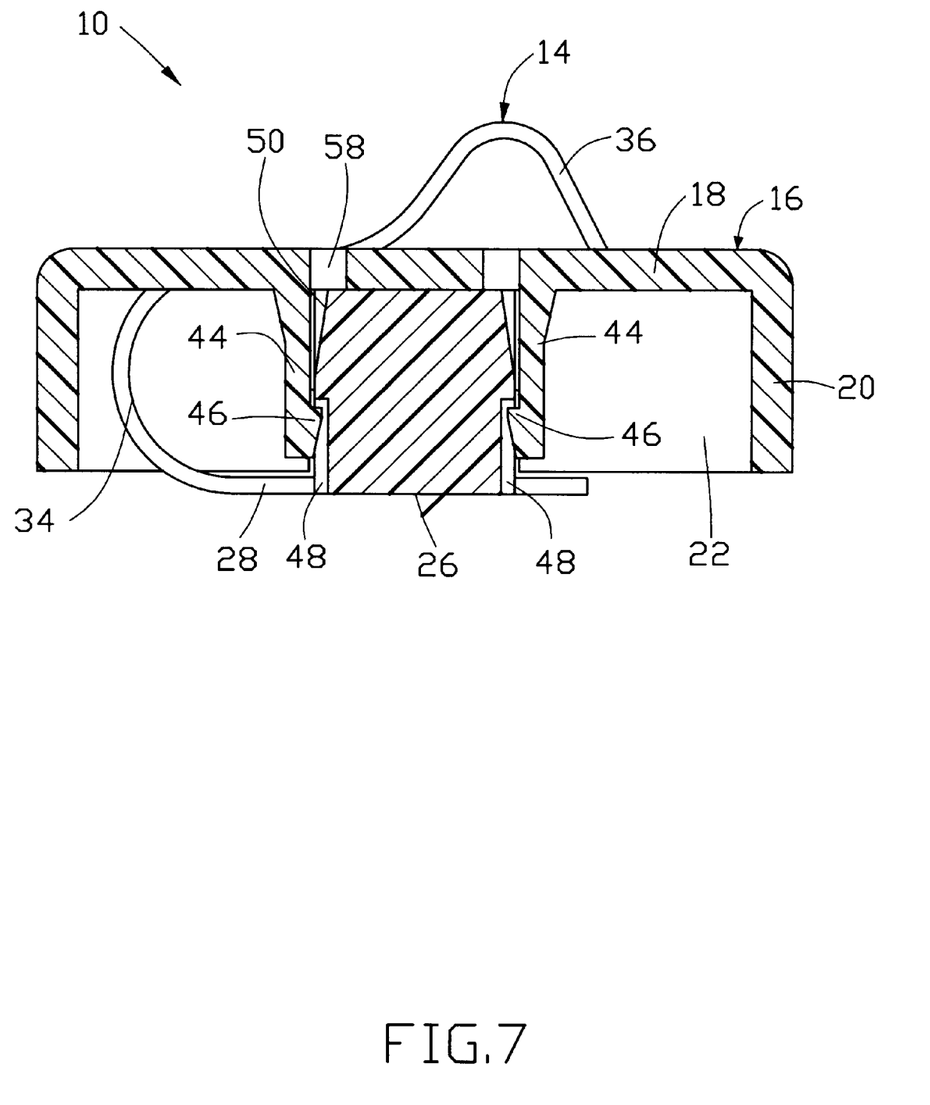
FIG. 7 is a cross-sectional view taken along line VII—VII of FIG. 5.
Figure 8:
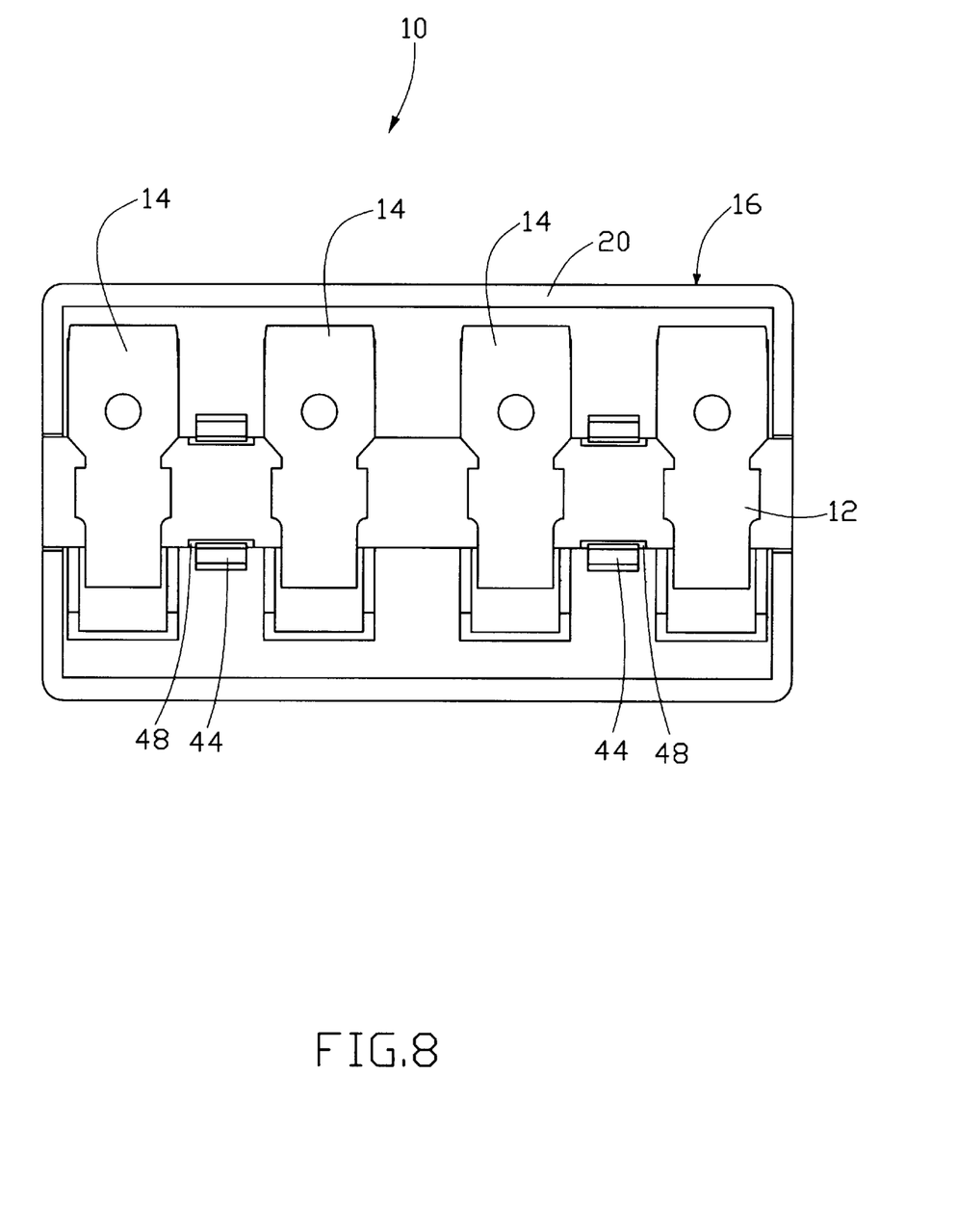
FIG. 8 is a bottom view of the battery connector.

Referring to the drawings and in particular to FIGS. 1–3, a battery connector 10 constructed in accordance with a first embodiment of the present invention comprises an elongate insulative base 12 and a plurality of conductive contacts 14 fixed to the base 12 and spaced from each other. In the embodiment illustrated, four contacts 14 are mounted to the base 12. An insulative cover 16 has a top wall 18 and a circumferential side wall 20 extending from the top wall 18 and defining an interior space 22 for receiving the base 12 and the contacts 14 therein through a bottom opening 24 thereof. The cover 16 forms opposite cutouts 25 in the side wall 20 for accommodating opposite ends of the base 12.

Also referring to FIGS. 4–7, the conductive contacts 14 are attached to a bottom face 26 of the base 12 by any known means, such as insertion molding as shown in the drawings. Other means, such as interferential fit or bolt, may also be used. Each contact 14 has a generally U-shape having a first limb 28 fixed to the bottom face 26 of the base 12 and a second limb 30 extending over and arranged above a top face 32 of the base 12. The second limb 30 is connected to and resiliently supported by a U-shaped connection section 34 for rendering the second limb 30 deflectable upon acted upon by an external force. Each second limb 30 forms a substantially V-shaped, convex engaging section 36.

The cover 16 defines a plurality of slots 38 in the top wall 18 thereof corresponding to the contacts 14 for the extension of the engaging sections 36 of the contacts 14. The engaging sections 36 are biased by the connection sections 34 thereof to project through the corresponding slots 38 for being engageable with corresponding contacts of a battery set (not shown).

A recess 40 is formed on the top wall 18 of the cover 16 along an edge of each slot 38 for engaging with a free end portion 42 of the second limb 30 of each contact 14 thereby pre-loading and retaining the second limb 30 and ensuring a proper and firm engagement between the contact 14 and the corresponding contact of the battery set.

In the embodiment illustrated, each slot 38 is rectangular having opposite longitudinal edges and opposite end edges with the recess 40 formed along one of the end edges. The longitudinal edges define a width of the slot 38 substantially corresponding to a width of the second limb 30 of corresponding contact 14 whereby the longitudinal edges of the slot 38 guide the movement of the second limb 30 and maintain the second limb 30 in position.

Referring to FIGS. 2–4 and 6–8, two pair of resilient arms 44 extending from the top wall 18 of the cover 16 into the interior space 22 thereof for guidance and restraint. The resilient arms 44 of each pair are spaced a distance substantially sufficient to receive the base 12 therebetween and form opposing barbs 46. The base 12 defines grooves 48 on opposite sides thereof for receiving and engaging with the barbs 46 thereby securing the cover 16 to the base 12. To facilitate the engagement of the barbs 46 with the grooves 48, the base 12 forms inclined faces 50 on opposite sides thereof corresponding to the arms 44 for guiding the barbs 46 into the grooves 48.

Furthermore, to properly position the cover 16 with respect to the base 12, a guide pin 52 extends from the top wall 18 of the cover 16 into the interior space 22 thereof for being inserted into a bore 54 defined in the base 12. The bore 54 may have a diverging opening 56 and the pin 52 has a tapering end for facilitating insertion of the pin 52 into the bore 54.

The top wall 18 of the cover 16 defines an opening 58 corresponding to each resilient arm 44 for receiving a tool (not shown) to deform the arm 44 and thus disengage the barb 46 from the corresponding groove 48 thereby releasing the cover 16 from the base 12.

Figure 9:
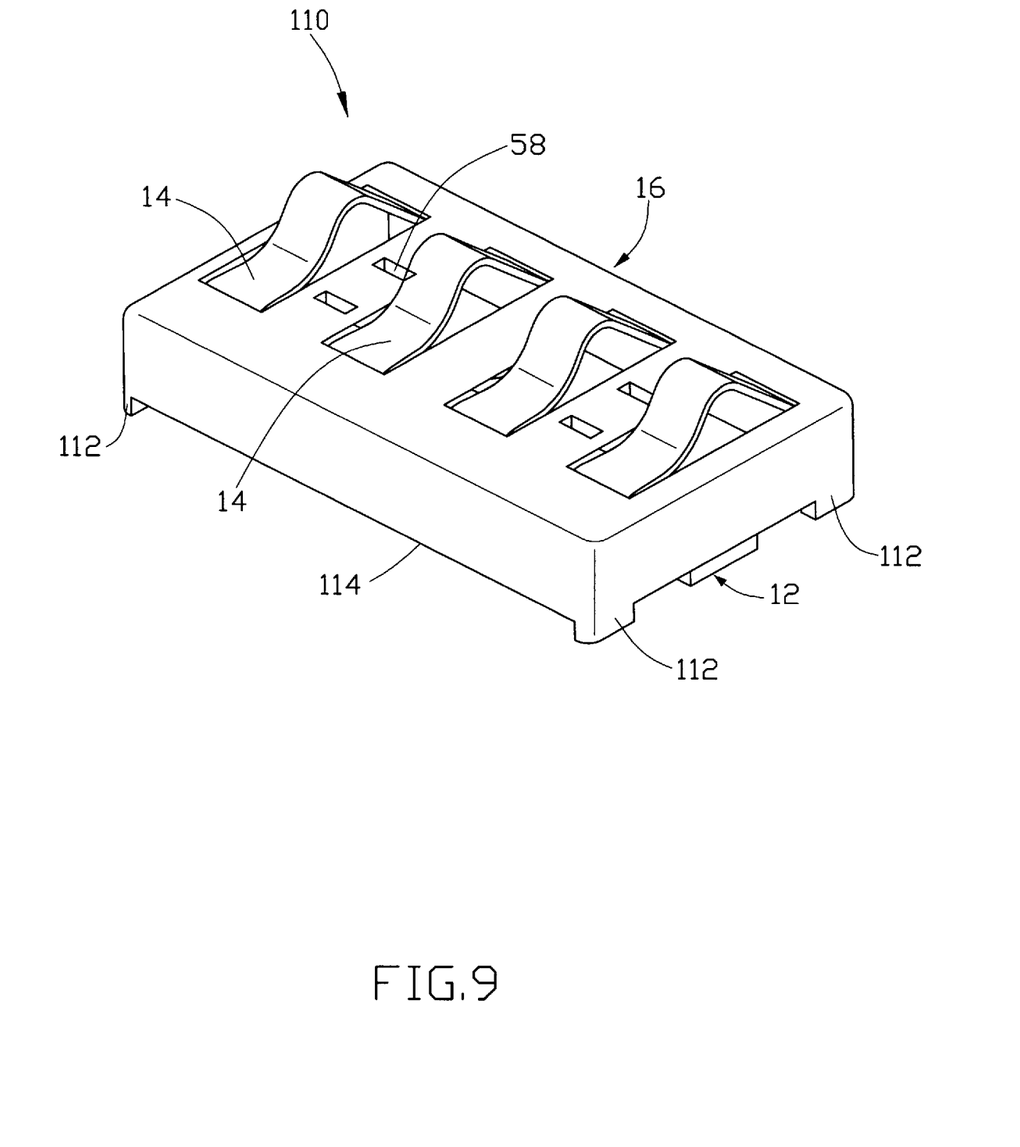
FIG. 9 is a perspective view of a battery connector constructed in accordance with a second embodiment of the present invention.
Figure 10:
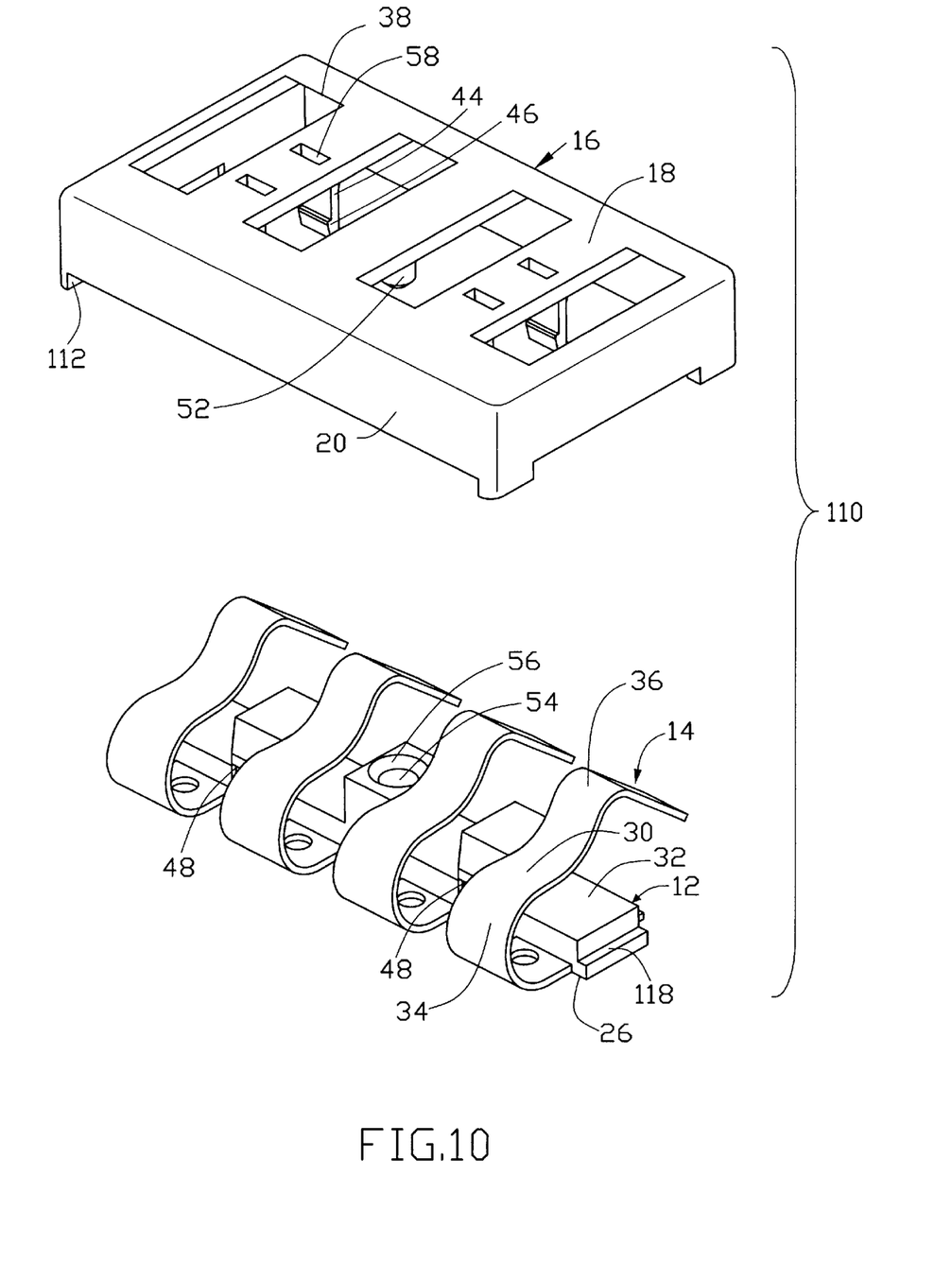
FIG. 10 is a perspective view of the battery connector of the second embodiment of the present invention.

Referring to FIGS. 9 and 10, a second embodiment 110 of the battery connector is shown, in which the same reference numerals are used to designate the same parts as those of the first embodiment with reference to FIGS. 1-8. The second embodiment 110 is substantially identical to the first embodiment 10 with the difference in that standoffs 112 extend from a bottom edge 114 of the side wall 20 of the cover 16 for more stably supporting the cover 16 on for example a circuit board (not shown). The openings 25 defined in the cover 16 of the first embodiment are removed and instead, the base 12 forms a step 118 on each of opposite ends thereof. The steps 118 have a height substantially corresponding to the standoffs 112 thereby allowing the stepped ends of the base 12 to be accommodated in a space between the standoffs 112. The remaining parts and construction of the second embodiment 110 are identical to those of the first embodiment 10 and thus no further details are needed herein.

Although the present invention has been described with reference to the preferred embodiments, it is apparent to those skilled in the art that a variety of modifications and changes may be made without departing from the scope of the present invention which is intended to be defined by the appended claims.

What is claimed is:

1. A battery connector comprising:
   an insulative base;
   a plurality of conductive contacts fixed to the base;
   an insulative cover defining an interior space for accommodating the base and the contacts therein with the contacts partially extending beyond the cover adapted to electrically engage with a battery; and
   securing means for securing the cover to the base;
   wherein the securing means comprises at least one pair of resilient arms extending from the cover, each forming a barb for engaging with a corresponding groove defined in the base thereby securing the cover to the base;
   wherein a guiding pin extends from the cover for being inserted into a bore defined in the base thereby properly positioning the cover with respect to the base;
   wherein the cover defines an opening corresponding to each resilient arm adapted to receive a tool that deforms the arm to disengage the barb from the groove thereby releasing the cover from the base;
   wherein each contact is generally U-shaped having a first limb attached to a bottom face of the base and a second limb extending over and spaced from a top face of the base, the second limb forming a convex engaging portion extending beyond the cover through a corresponding slot defined in the cover for electrically engaging with the battery, the second limb being connected to and resiliently supported by a U-shaped connection portion for biasing the engaging section beyond the cover;
   wherein the second limb of each contact has a free end engaging with an edge of the corresponding slot of the cover for pre-loading the second limb;
   wherein a recess is defined in the edge of the slot for accommodating and retaining the free end of the second limb;
   wherein the second limb has a width, the slot being defined by opposite longitudinal edges spaced from each other a distance substantially corresponding to the width of the second limb whereby the second limb is guided to move by the longitudinal edges of the slot.

2. The battery connector as claimed in claim 1, wherein the cover comprises standoffs extending therefrom.

3. A battery connector comprising:
   an elongate insulative base having a bottom face, an opposite top face and two side faces;
   a plurality of conductive contacts fixed to the base and spaced from each other, each contact having a first limb fixed to the bottom face of the base and a second limb resiliently supported above the top face of the base;
   an insulative cover having a top wall and a circumferential side wall extending from the top wall and defining an interior space for receiving the base and the contacts therein, the top wall defining a plurality slots through which the second limbs of the contacts partially extend adapted to electrically engage a battery, at least a pair of resilient arms extending from the top wall of he cover and into the interior space, the arms being spaced to accommodate the base therebetween, each arm forming a barb engaging with a groove defined in the corresponding side face of the base for securing the cover to the base;
   wherein a guiding pin extends from the top wall of the cover for being inserted in a bore defined in the base thereby properly positioning the cover with respect to the base;
   wherein the top wall of the cover defines an opening corresponding to each resilient arm adapted to receive a tool that deforms the arm to disengage the barb from the groove thereby releasing the cover from the base;
   wherein the second limb of each contact forms a convex engaging portion extending beyond the cover through the corresponding slot, the second limb being resiliently supported by a U-shaped connection portion for biasing the engaging section beyond the cover;
   wherein the second limb of each contact has a free end engaging with an edge of the corresponding slot of the cover for pre-loading the second limb;
   wherein a recess is defined in the edge of the slot for accommodating and retaining the free end of the second limb.

4. The battery connector as claimed in claim 3, wherein the cover comprises standoffs extending from a bottom edge of the side wall thereof.

* * * * *